(12) United States Patent
Zhang et al.

(10) Patent No.: US 9,490,634 B2
(45) Date of Patent: Nov. 8, 2016

(54) POWER DISTRIBUTION SYSTEM USING MULTIPLE POWER MODULES, AND METHOD

(71) Applicant: General Electric Company, Schenectady, NY (US)

(72) Inventors: Juan Zhang, ShangHai (CN); Ming Fu, ShangHai (CN); Mark Allen Johnson, Plano, TX (US)

(73) Assignee: General Electric Company, Schenectady, NY (US)

( * ) Notice: Subject to any disclaimer, the term of this patent is extended or adjusted under 35 U.S.C. 154(b) by 39 days.

(21) Appl. No.: 14/552,525

(22) Filed: Nov. 25, 2014

(65) Prior Publication Data

US 2016/0020695 A1    Jan. 21, 2016

(30) Foreign Application Priority Data

Nov. 22, 2013 (CN) .......................... 2013 1 0597801

(51) Int. Cl.
*G05F 3/16* (2006.01)
*H02J 3/46* (2006.01)
*H02J 1/10* (2006.01)
*H02J 3/38* (2006.01)

(52) U.S. Cl.
CPC .. *H02J 3/46* (2013.01); *H02J 1/10* (2013.01); *H02J 3/381* (2013.01)

(58) Field of Classification Search
USPC .................................................. 323/311–317
See application file for complete search history.

(56) References Cited

U.S. PATENT DOCUMENTS

| 7,728,574 B2 * | 6/2010 | Kalyanaraman | .......... G05F 3/30 323/313 |
| 2009/0140665 A1 | 6/2009 | Park | |
| 2011/0227485 A1 * | 9/2011 | Huynh | ................. H05B 33/083 315/127 |
| 2015/0115916 A1 | 4/2015 | Schweigert | |

FOREIGN PATENT DOCUMENTS

| CN | 101375482 A | 2/2009 |
| CN | 101521454 A | 9/2009 |
| CN | 101572418 A | 11/2009 |

(Continued)

OTHER PUBLICATIONS

Unofficial English Translation of Chinese Office Action issued in connection with corresponding CN Application No. 201310597801.6 on Jun. 2, 2016.

*Primary Examiner* — Adolf Berhane
*Assistant Examiner* — Nusrat Quddus
(74) *Attorney, Agent, or Firm* — GE Global Patent Operation; Stephen G. Midgley

(57) ABSTRACT

An exemplary power distribution system includes multiple power modules and a controller. The multiple power modules are coupled in parallel to supply power to a load. The controller is configured to provide a total number of the power modules and unique numbers to each member of the power modules. At least a member of the multiple power modules is set up to independently determine its own ON status and OFF status based on the total number and the unique numbers when the power distribution system is in operation, wherein an $ON_{threshold}$ in association with a corresponding unique number is determined to decide its own ON status. A method for operating the power distribution and an energy distribution system are also described.

8 Claims, 7 Drawing Sheets

(56) References Cited

FOREIGN PATENT DOCUMENTS

| | | |
|---|---|---|
| CN | 102005903 A | 4/2011 |
| CN | 202374186 U | 8/2012 |
| CN | 103050879 A | 4/2013 |
| EP | 1199205 B1 | 1/2012 |
| EP | 2645556 A1 | 10/2013 |

* cited by examiner

POWER DISTRIBUTION SYSTEM USING MULTIPLE POWER MODULES, AND METHOD

BACKGROUND

This disclosure generally relates to power distribution systems and methods for matching the power between multiple power modules and a load.

Compared to conventional power source systems, power distribution systems are advantageous in small size and light weight and have been widely used nowadays. Due to the voltage or current limitation of the power semiconductors (e.g., IGBTs), multiple paralleled power modules are used to increase the power supply capacity.

A current sharing method is usually implemented to allow each power module to supply equal current to the load. In order to make full use of each power module and extend the lifetime of each power module, it is desired to match the power between the multiple power modules and the load. The match process can be achieved by selecting reasonable number of power modules to work at ON status according to the requirements of the load. During the match process, oscillations caused by status switching may happen especially when the load fluctuates tremendously. Therefore, how to select a reasonable number of power modules with the change of the load and avoid the oscillations are challengeable. Moreover, it is necessary to find an easy method to achieve a dynamic coordinated control among the multiple power modules so as to ensure each power module can work in the high efficiency area.

Therefore, it is desirable to provide systems and methods to address at least one of the above-mentioned problems.

BRIEF DESCRIPTION

One aspect of the present invention resides in a power distribution system. The power distribution system includes multiple power modules and a controller. The multiple power modules are coupled in parallel to supply power to a load. The controller is configured to provide a total number of the power modules and unique numbers to each member of the power modules. At least a member of the multiple power modules is set up to independently determine its own ON status and OFF status based on the total number and the unique numbers when the power distribution system is in operation, wherein an $ON_{threshold}$ in association with a corresponding unique number is determined to decide its own ON status.

Another aspect of the present invention resides in a method for operating a power distribution system. The method includes providing a total number of the power modules and unique numbers to each member of the power modules by a controller. The method includes setting at least a member of the power modules to independently determine its own ON status and OFF status based on the total number and the unique numbers when the power distribution system is in operation. The method includes determining an $ON_{threshold}$ in association with a corresponding unique number is to decide its own ON status.

Yet another aspect of the present invention resides in an energy distribution system. The energy distribution system includes multiple energy modules and a controller. The multiple energy modules are coupled in parallel to supply power to a load. The controller is configured to provide a total number of the energy modules and unique numbers to each member of the energy modules. At least a member of the multiple energy modules is set up to remain an ON status and each of the other power modules is set up to independently determine its own ON status or OFF status based on the total number of the energy modules, the unique numbers, and an $I_{share}$ when the energy distribution system is in operation, wherein the $I_{share}$ comprises an average current relate to the load. The corresponding unique number is indicative of an $ON_{threshold}$, an $OFF_{threshold}$ with each energy module, and a comparison of its $ON_{threshold}$ and $OFF_{threshold}$ with the $I_{share}$ is used to decide its own ON status and OFF status respectively.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean either, any, several, or all of the listed items. The use of "including," "comprising," or "having," and variations thereof herein are meant to encompass the items listed thereafter and equivalents thereof as well as additional items. The terms "coupled" is not restricted to physical or mechanical connections or couplings, and can include electrical connections or couplings, whether direct or indirect. Furthermore, the terms "circuit" and "controller" may include either a single component or a plurality of components, which are either active and/or passive and may be optionally be connected or otherwise coupled together to provide the described function.

As used herein, the terms "may," "can," "may be," and "can be" indicate a possibility of an occurrence within a set of circumstances; a possession of a specified property, characteristic or function; and/or qualify another verb by expressing one or more of an ability, capability, or possibility associated with the qualified verb. Accordingly, usage of "may," "can," "may be," and "can be" indicate that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may," "can," "may be," and "can be".

Figure 1:
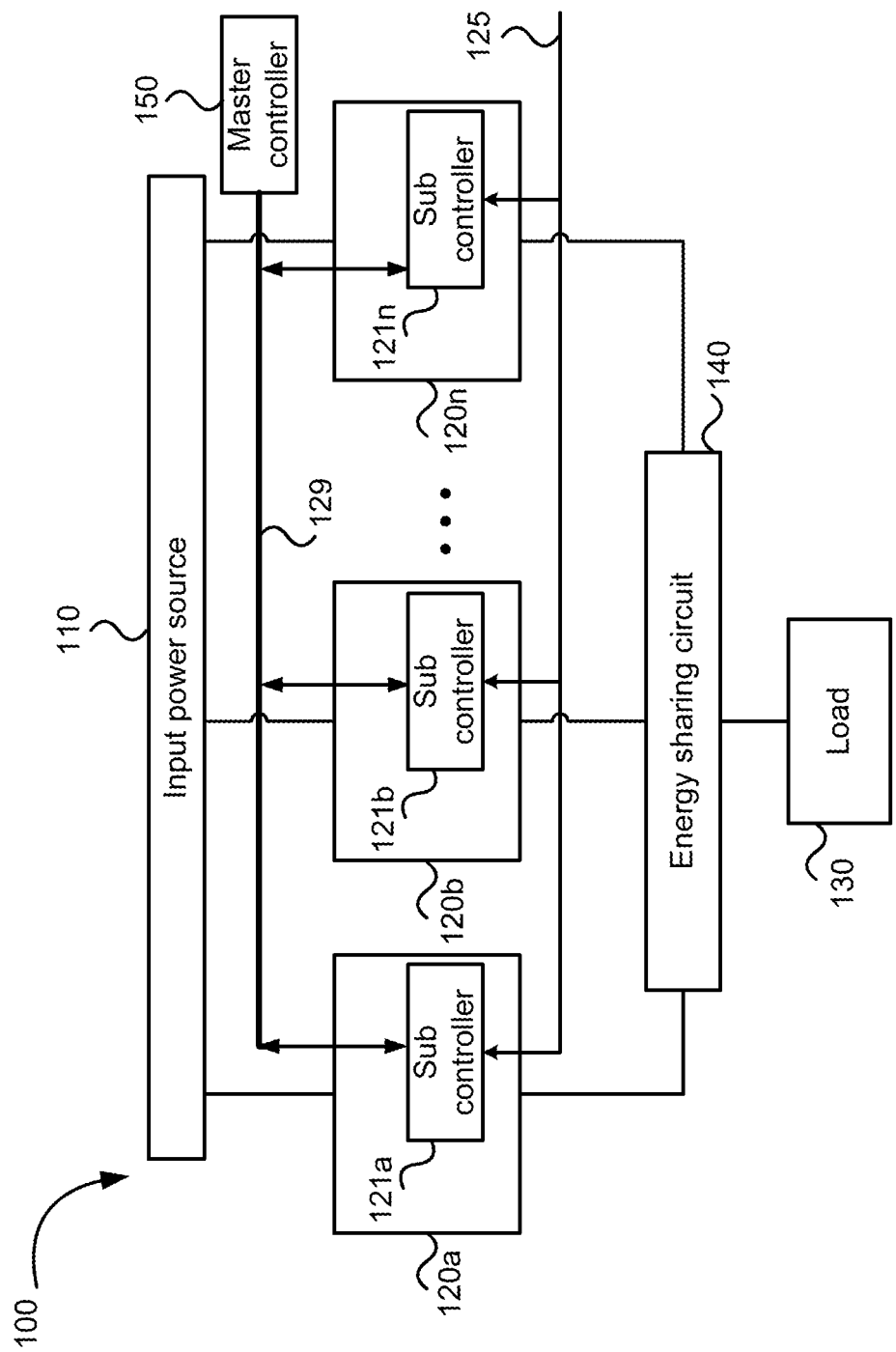
FIG. 1 is a block diagram of an energy distribution system in accordance with an illustrative embodiment.

Referring to FIG. 1, a block diagram of an energy distribution system 100 is shown. In one embodiment, the energy distribution system 100 includes an input power source 110, multiple energy modules 120a~120n, an energy sharing circuit 140, and a master controller 150.

The input power source 110 can be in any suitable forms for providing different forms of input power according to different requirements of the multiple energy modules 120a~120n. In some embodiments, the input power source 110 can supply DC power and/or AC power.

The multiple energy modules 120a~120n are coupled in parallel between the input power source 110 and the load 130. Each member of the multiple energy modules 120a~120n is configured to output a sub energy for providing to the load 130. The sub energy includes but not limited to electrical power and mechanical energy.

Take the electrical power as an example, the energy distribution system 100 can be used to convert wind energy or solar energy for providing electrical power to the grid. Each energy module (e.g., the energy module 120a) includes a wind turbine or a solar panel.

The multiple energy modules 120a~120n can be designed with the same structure or different structures. In some embodiments, multiple switched power modules can be used as the multiple energy modules 120a~120n. In some embodiments, wind turbines and solar panels can be used as the multiple energy modules 120a~120n.

As is shown in FIG. 1, each energy module includes a sub controller (e.g., the energy module 120a includes a sub controller 121a). The plurality of sub controllers 121a~121n can communicate with each other via a communication bus 129. The master controller 150 is configured to send commands to the plurality of sub controllers 121a~121n. In some embodiments, the master controller 150 can be removed and one of the plurality of sub controllers 121a~121n (e.g., the sub controller 121a) is used to act as the master controller 150.

Each sub controller (e.g., the sub controller 121a) or the master controller 150 may include any suitable programmable circuits or devices such as a digital signal processor (DSP), a field programmable gate array (FPGA), a programmable logic controller (PLC), and an application specific integrated circuit (ASIC). In some embodiments, the plurality of sub controllers or the master controller 150 may be implemented in the form of hardware, software, or a combination of hardware and software.

In some embodiments, some initialization parameters and control parameters can be programmed or set up in a controller (e.g., one of the plurality of sub controllers 123a~123n or the master controller 150) and then sent to each sub controller. In some embodiments, the initialization parameters and control parameters can be programmed or set up during manufacturing or factory test time by an off-line controller. In other embodiments, the initialization parameters and control parameters can be programmed or set up in the plurality of sub controllers themselves independently.

The energy that the load 130 requires is shared equally among the multiple energy modules which are operated at ON status via the energy sharing circuit 140. In some embodiments, an energy sharing signal 125, more specifically a current sharing signal, is generated by the energy sharing circuit 140 or calculated according to a ratio of a total current of the load 130 and the number of energy modules which are at ON status. The energy sharing circuit 140 can be implemented in the form of hardware or software or a combination thereof for dealing with the sub energy. In other embodiments, the energy sharing circuit 140 can be removed from the energy distribution system 100.

An independent decision-making strategy for an energy module to determine its own ON status and OFF status is conceived which will be described in detail with reference to FIG. 2 or 3 below.

Figure 2:
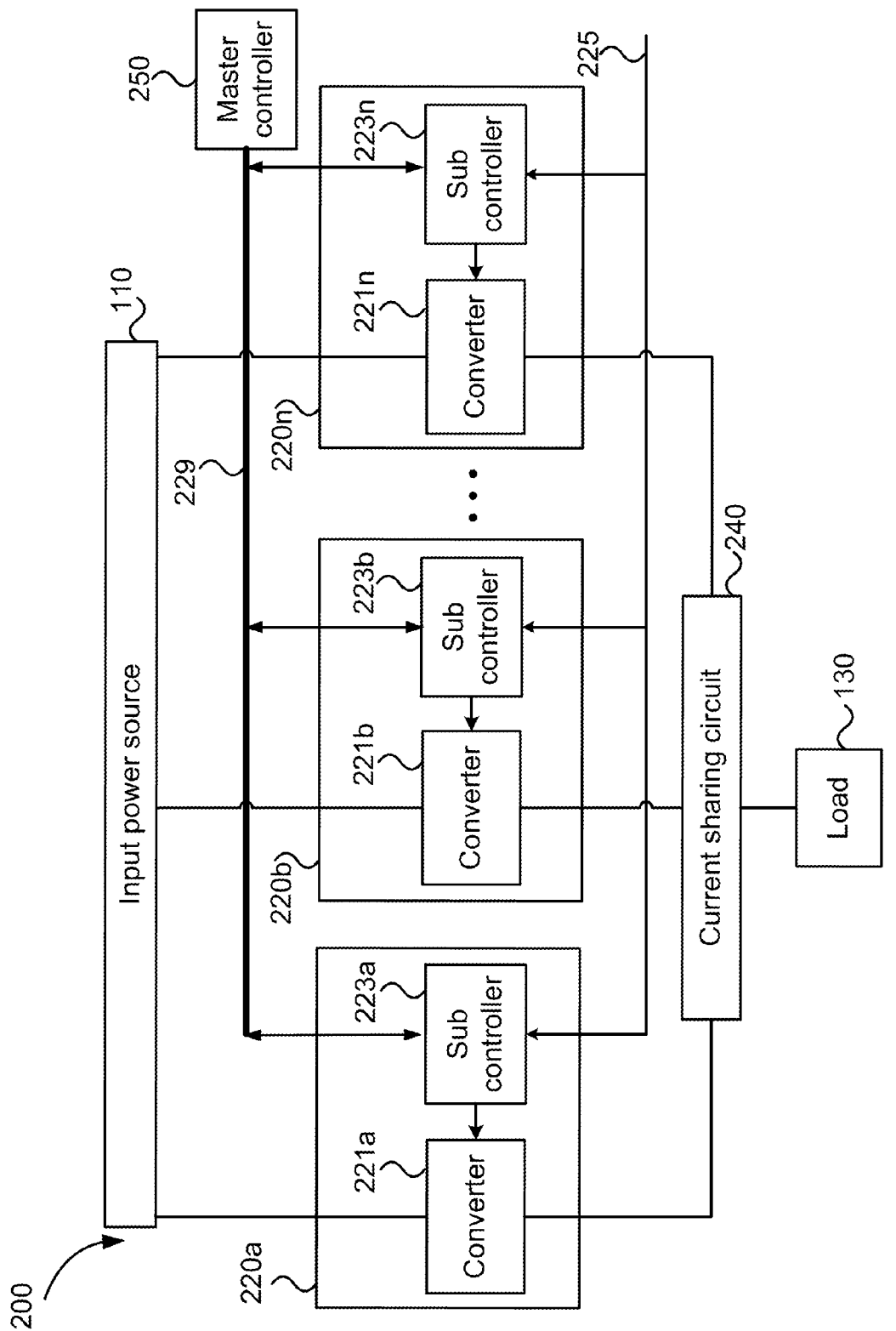
FIG. 2 is a block diagram of a power distribution system as an example of the energy distribution system shown in FIG. 1 in accordance with an illustrative embodiment.

Referring to FIG. 2, a block diagram of a power distribution system 200 as an example of the energy distribution system 100 shown in FIG. 1 is shown. In this embodiment, multiple power modules 220a~220n are used as the multiple energy modules 120a~120n. Each member of the multiple power modules 220a~220n includes a converter and a sub controller (e.g., the power module 220a includes a converter 221a and a sub controller 223a), the converter is controlled by the sub controller to convert the input power provided by the input power source 110 into a sub power for providing to the load 130.

In some embodiments, the converter (e.g., the converter 221a) includes an inverter for inverting a DC input power to an AC sub power. In some embodiments, the converter (e.g., the converter 221a) includes a rectifier for converting an AC input power to a DC sub power. In some embodiments, the converter (e.g., the converter 221a) includes a DC/DC converter for converting a DC input power to a DC sub power. In some embodiments, the converter (e.g., the converter 221a) includes an AC/AC converter for converting an AC input power to an AC sub power.

In some embodiments, the input power source 110 includes a DC power source such as a DC generator and a battery. In some embodiments, the input power source 110 includes an AC power source such as 50 Hz AC grid and an AC generator.

As is shown in FIG. 2, a current sharing circuit 240 is used as the energy sharing circuit 140 shown in FIG. 1. In some embodiments, the current sharing circuit 240 is coupled to each output of the converter and receives output voltage/current provided from each converter. The current sharing circuit 240 is used to share a total current of the load 130 among the power modules which are at ON status. Herein each power module provides an equal sub current to the load 130.

In this embodiment, the master controller 250 is configured to communicate with the multiple power modules 220a~220n, more specifically, the master controller 250 is configured to communicate with the plurality of sub controllers 223a~223n via a communication bus 229. In another embodiment shown in FIG. 3, the master controller 250 shown in FIG. 2 is removed. One of the plurality of the sub controllers 223a~223n (e.g., the sub controller 223a) is used to act as the master controller 250. The sub controller 223a is configured to communicate with the other sub controllers 223b-223n via a communication bus 329.

Figure 3:
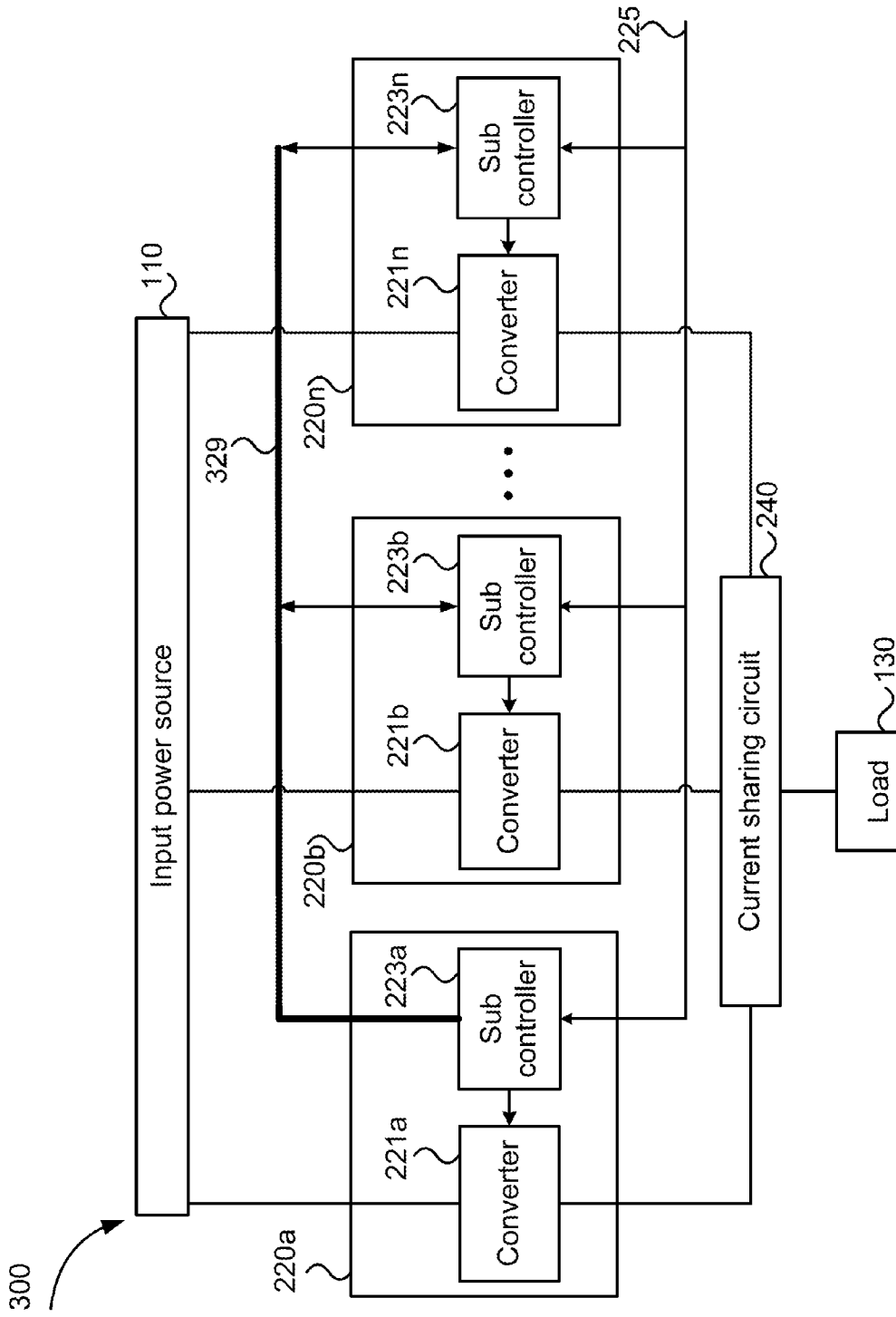
FIG. 3 is a block diagram of a power distribution system as an example of the energy distribution system shown in FIG. 1 in accordance with another illustrative embodiment.

For the power distribution systems shown in FIG. 2 and FIG. 3, at least one power module is set up to independently determine its own ON status or OFF status. In these embodiments, ON status refers to that a power module is controlled by a corresponding sub controller to provide sub power to the load 130. OFF status refers to that a power module stops providing sub power to the load 130. For particular applications, OFF status can be standby, sleep, hibernate, temporarily shut-down, or permanently shut-down.

When the power module is operated at the standby, sleep, hibernate, temporarily shut-down, or permanently shut-down status, the corresponding power module receives input power from the input power source 110 but doesn't take any actions, for example, no power conversion process. That is, no sub power is provided to the load 130. As soon as the power module is switched from OFF status to ON status, the power module can provide sub power to the load 130 immediately according to the control signals generated by the associated sub controller. That means there is no need to restart an initialization process.

When the power module is operated at the shut-down status, the corresponding power module is totally blocked from the input power source 110. That means the power module doesn't receive input power from the input power source 110 and doesn't take any actions, for example, no power conversion process. That is, no sub power is provided to the load 130. When the power module is switched from OFF status to ON status, the power module which is at the shut-down status should restart an initialization process first and then output a sub power to the load 130 according to the control signals generated by the associated sub controller.

In the initialization process, the master controller 250 shown in FIG. 2 or the sub controller 223a shown in FIG. 3 is configured to send a total number of the multiple power modules 220a~220n and assign each unique number to each sub controller randomly. According to each unique number, each power module has an equal opportunity to remain at ON status or switch between ON status and OFF status. The average lifetime of each power module can be extended.

Figure 4:
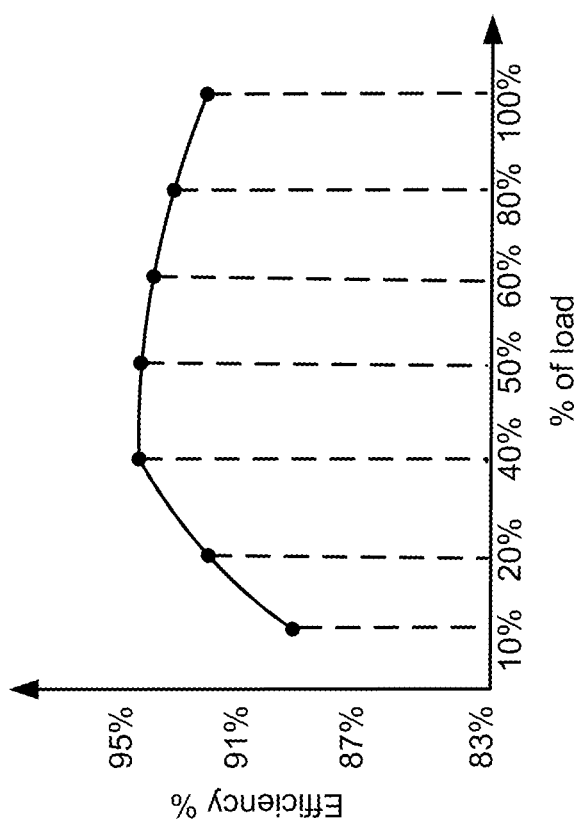
FIG. 4 is a load efficiency range of a power module in accordance with an illustrative embodiment.

In the initialization process, some other initialization parameters such as the maximum percent of load $MAX_{eff\_range}$ and the minimum percent of load $MIN_{eff\_range}$ are further programmed in the master controller 250 shown in FIG. 2 or the sub controller 223a shown in FIG. 3. The $MAX_{eff\_range}$ and $MIN_{eff\_range}$ can be defined according to a high load efficiency range of each power module which can be seen from the efficiency curve shown in FIG. 4. FIG. 4 shows an exemplary efficiency curve of the power module, the horizontal axis represents the percent of load that a power module provides and the vertical axis represents the efficiency between an input and an output of the power module correspondingly. As an example, 40% can be defined as the $MIN_{eff\_range}$ and 65% can be defined as the $MAX_{eff\_range}$. That is, the range of 40%-65% of load can be defined as a high load efficiency range.

In other embodiments, in the initialization process, the above initialization parameters are programmed or set up during manufacturing or factory test time by an off-line controller or by the plurality of sub controllers themselves independently.

Based on the total number of the power modules, the unique numbers, $MAX_{eff\_range}$ and $MIN_{eff\_range}$, a unique ON threshold value $ON_{threshold}$ and a unique OFF threshold value $OFF_{threshold}$ are determined in each power module that is switched between ON status and OFF status. Each $ON_{threshold}$ and $OFF_{threshold}$ are used to decide its own ON status and OFF status respectively.

Each $ON_{threshold}$ is related to each corresponding unique number and lies within the high load efficiency range. In some embodiments, for each power module, its $OFF_{threshold}$ is lower than its $ON_{threshold}$. That means the $OFF_{threshold}$ and the associated $ON_{threshold}$ are spread apart by a hysteresis value. For different power modules, the hysteresis value can be the same or different.

In some embodiments, the plurality of $ON_{threshold}$ and $OFF_{threshold}$ can be first calculated in the master controller 250 shown in FIG. 2 or the sub controller 223a shown in FIG. 3 and then sent to each sub controller respectively. In other embodiments, each $ON_{threshold}$ and $OFF_{threshold}$ can be calculated by each sub controller itself.

In the operation process, how to determine its ON status and OFF status independently by each sub controller is as following. For a power module that is switched between ON status and OFF status, a sub controller is configured to compare an $I_{share}$ 225 with its $ON_{threshold}$ and $OFF_{threshold}$ to determine its own ON status and OFF status respectively. In some embodiments, the $I_{share}$ 225 includes an average current value which is generated by the current sharing circuit 240 or calculated according to the total current of the load 130.

More specifically, take a power module which is operated at ON status for example. The power module is controlled to enter OFF status from ON status when the $I_{share}$ 225 crosses its $OFF_{threshold}$. Otherwise, the power module is remained at ON status. Take a power module which is operated at OFF status for example. The power module is controlled to enter ON status from OFF status when the $I_{share}$ 225 crosses its $ON_{threshold}$. Otherwise, the power module is remained at OFF status. The $I_{share}$ 225 changes dynamically since the number of the power modules which is operated at ON status changes dynamically.

For the above embodiments, the power module can switch between ON status and OFF status immediately without any delay time. However, oscillations may happen when the $I_{share}$ 225 fluctuates tremendously especially when the $I_{share}$ 225 fluctuates around the $OFF_{threshold}$. In order to avoid the oscillations and ensure the power modules can be quickly controlled to work at the ON status to provide enough power to the load 130, an OFF delay time $OFF_{delay}$ is further defined besides the $ON_{threshold}$ and the $OFF_{threshold}$. During the $OFF_{delay}$, if the $I_{share}$ 225 is continuously lower than the $OFF_{threshold}$, the power module can enter OFF status from ON status until its $OFF_{delay}$ is exceeded.

In a more particular configuration, in case that $I_{share}$ 225 may fluctuate around the $ON_{threshold}$, an ON delay time $ON_{delay}$ is further defined besides the $OFF_{delay}$. During the $ON_{delay}$, if the $I_{share}$ 225 is continuously higher than the $ON_{threshold}$, the power module can enter ON status from OFF status until its $ON_{delay}$ is exceeded.

Figure 5:
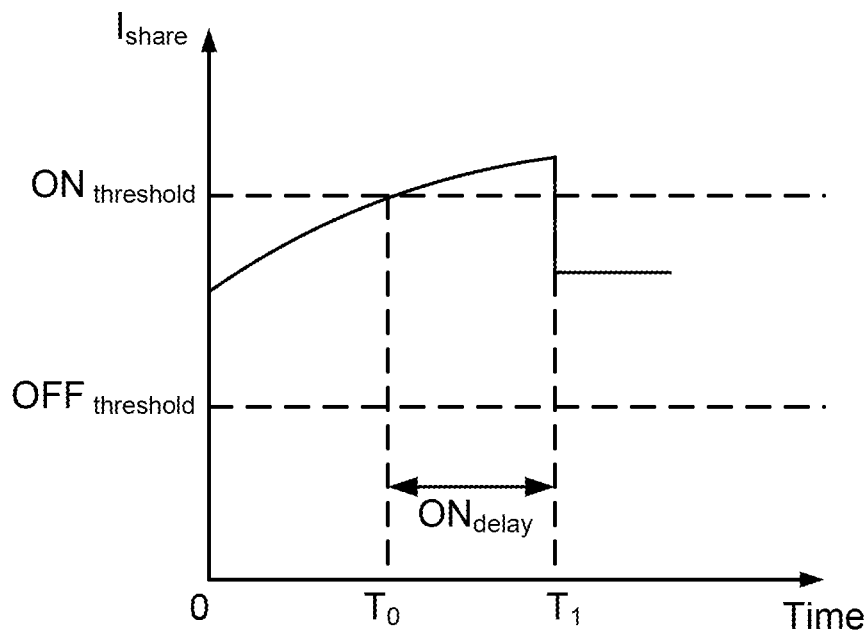
FIG. 5 is an $I_{share}$ curve when a power module shown in FIG. 2 or 3 is switched from OFF status to ON status in accordance with an illustrative embodiment.

Referring to FIG. 5, an $I_{share}$ curve when a power module is switched from OFF status to ON status is shown. It can be seen that, at time T0, with the increase of the load 130, the $I_{share}$ crosses the $ON_{threshold}$ and is higher than the $ON_{threshold}$ during $ON_{delay}$ from T0 to T1, then the power module is controlled to enter ON status form OFF status. Since one more power module is controlled to work at ON status to provide sub power to the load 130, the $I_{share}$ starts to decrease from time T1.

Figure 6:
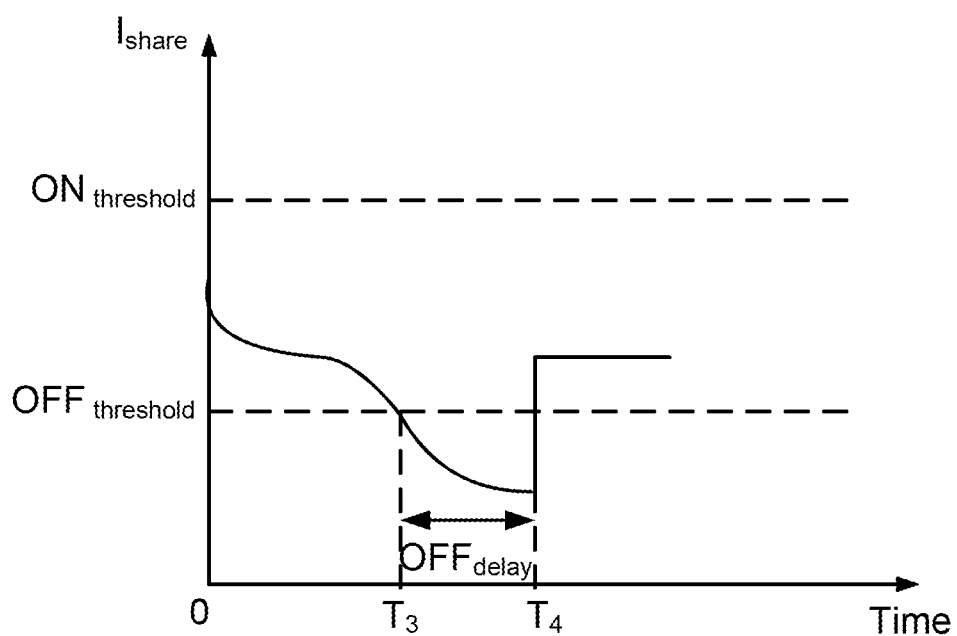
FIG. 6 is an $I_{share}$ curve when a power module shown in FIG. 2 or 3 is switched from ON status to OFF status in accordance with an illustrative embodiment.

Referring to FIG. 6, an $I_{share}$ curve when a power module is switched from ON status to OFF status is shown. It can be seen that, at time T3, with the decrease of the load 130, the $I_{share}$ crosses the $OFF_{threshold}$ and is lower than $OFF_{threshold}$ during $OFF_{delay}$ from T3 to T4, then the power module is controlled to enter OFF status from ON status. Since one less power module is controlled to work at ON status, the $I_{share}$ starts to increase from time T4.

An exemplary algorithm for obtaining the above parameters will be illustrated below. Suppose among a number of $N_{total}$ power modules that can work normally, a number of $M^*$ ($M^* \geq 0$) power modules are controlled to remain at ON status and the other $N_{total}-M^*$ power modules are controlled to switch between ON status and OFF status. In the initialization process, the master controller 250 (or one of the sub controllers) is configured to assign the total number $N_{total}$ and a unique number $N_{unique}$ to each power module. In one embodiment, a continuous unique numbers $N_{unique} \in (n, \ldots, n+N_{total}-1-M^*)$, where n refers to a natural number, are sent to each of the power module that is switched between ON status and OFF status and other unique numbers are sent to each of the power modules that is remained ON status.

For each power module that is remained at ON status, its converter is configured to convert the input power to sub power for providing to the load 130 according to the control signals provided by its controller.

For each power module that is switched between ON status and OFF status, the converting process is determined according to a comparison of its $ON_{threshold\_Nunique}$ and $OFF_{threshold\_Nunique}$ with the $I_{share}$ 125.

One exemplary for calculating $ON_{threshold\_Nunique}$ is as the following equation:

$$ON_{threshold\_Nunique} = MIN_{eff\_range} + \frac{N_{unique} - n}{N_{total} - M^* - 1}(MAX_{eff\_range} - MIN_{eff\_range}) \quad (1)$$

Where the $MIN_{eff\_range}$ and the $MAX_{eff\_range}$ refer to the minimum and maximum percent of load that the power module can work in a high efficiency range respectively. One exemplary for calculating $OFF_{threshold\_Nunique}$ is as the following equation:

$$OFF_{threshold\_Nunique} = \frac{M^* + N_{unique} - n}{M^* + N_{unique} - n + 1} ON_{threshold\_Nunique} - OFF_{margin}, \quad (2)$$

Where $OFF_{margin}$ refers to a margin for calculating the $OFF_{threshold\_Nunique}$. Taking a critical state into consideration, it can be seen form (2) that when the $I_{share}$ equals to $ON_{threshold\_Nunique}$ at the critical state, the power module is controlled to enter ON status from OFF status. Due to one more power module is used to provide sub power, the $I_{share}$ is decreased to the expression:

$$\frac{M^* + N_{unique} - n}{M^* + N_{unique} - n + 1} ON_{threshold\_Nunique}$$

In order to avoid an oscillation caused by switching the same power module from OFF status to ON status, it is necessary to keep the decreased $I_{share}$ higher than the $OFF_{threshold\_Nunique}$. Therefore, the $OFF_{margin}$ is used to lower the $OFF_{threshold\_Nunique}$.

In some embodiments, an OFF delay time $OFF_{delay}$ is further defined. One exemplary for calculating $OFF_{delay\_Nunique}$ is as the following equation:

$$OFF_{delay\_Nunique} = B_{off} + (n + N_{total} - M^* - 1 - N_{unique})k_{off} \quad (3)$$

Where $B_{off}$ is a basic OFF delay time for the power module which has the largest $ON_{threshold}$. In some embodiments, $B_{off}$ can be set to 1. $k_{off}$ is an interval between each two OFF delay time. The larger the unique number is, the larger its OFF delay time is. As a result, during the independent decision-making process, the power modules can be switched off one by one to avoid the oscillation.

In some embodiments, an ON delay time $ON_{delay}$ is further defined on the basis of $OFF_{delay}$. One exemplary for calculating $ON_{delay\_Nunique}$ is as the following equation:

$$ON_{delay\_Nunique} = B_{on} + (N_{unique} - n)k_{on} \quad (4)$$

Where $B_{on}$ is a basic ON delay time for the power module which has the smallest $ON_{threshold}$. In some embodiments, $B_{on}$ can be set to 1. $k_{on}$ is an interval between each two ON delay time. The larger the unique number is, the lower its ON delay time is.

In some embodiments, it is desired to control the power module to enter the ON status quickly and enter the OFF status slowly. Thus, for the power module that is switched between ON status and OFF status, its $ON_{delay}$ can be set to zero. That means the power distribution system 200 can also be controlled stably without $ON_{delay}$.

In some embodiments, the above parameters $ON_{threshold}$, $OFF_{threshold}$, and $OFF_{delay}$ can be programmed or set up in the master controller 250 (or one of the sub controllers) and sent to each member of the power modules 220a~220n. In some embodiments, the above parameters $ON_{threshold}$, $OFF_{threshold}$, $OFF_{delay}$ can be programmed or set up individually in each sub controller. In some embodiments, $ON_{threshold}$, $OFF_{threshold}$, $OFF_{delay}$ are set according to experience.

Here is an example of the algorithm with specific parameters to operate the power distribution system 200 shown in FIG. 2. The details will be described combined with the following table.

| $N_{unique}$ | $ON_{threshold}$ | $OFF_{threshold}$ | $OFF_{delay}$ (s) |
|---|---|---|---|
| 7 | 65% | 51.875% | 1 |
| 6 | 60% | 46.43% | 5 |
| 5 | 55% | 40.83% | 9 |
| 4 | 50% | 35% | 13 |
| 3 | 45% | 28.75% | 17 |
| 2 | 40% | 21.7% | 21 |
| 1 | | ON status | |
| 0 | | ON status | |

In the initialization process, the initialization parameters can be defined as follows: $MIN_{eff\_range} = 40\%$, $MAX_{eff\_range} = 65\%$, $M^* = 2$, $N_{total} = 8$, $n = 2$, $OFF_{margin} = 5\%$, $B_{off} = 1$, $k_{off} = 4$, $N_{unique} \in (0, 1, \ldots, 6, 7)$.

The power modules with $N_{unique}=0$, or 1 are controlled to remain at ON status. For the power modules with $N_{unique} \geq 2$, each $ON_{threshold\_Nunique}$ and $OFF_{threshold\_Nunique}$ can be calculated according to equations (1) and (2) respectively. In other embodiments, the $ON_{threshold\_Nunique}$ can be defined without any rules. For example, for the power modules that are switched between ON status and OFF status, 40%, 43%, 49%, 53%, 56%, 60% are accepted.

In this embodiment, as is shown in the table, the OFF delay times are arranged from 21 s to 1 s with the increase of the unique number and with the same interval 4 s between neighbor OFF delay times. In other embodiments, the OFF delay times may be arranged without rules respectively.

The dynamic coordinated control method is implemented as below. When the power distribution system 200 is initiated, the power modules with the unique number $N_{unique}$ from 0 to 7 can be quickly enabled to provide sub power to the load 130. The $I_{share}$ is 20% after the power distribution system 200 reaches a stable state. Each OFF delay time is counted down.

For the power modules with the unique numbers $N_{unique} \in (2, \ldots, 6, 7)$, each sub controller is used to compare the $I_{share}$ 20% with each $OFF_{threshold\_Nunique}$. The average current signal 20% is lower than $OFF_{threshold\_7}$ 51.875%, $OFF_{threshold\_6}$ 46.43%, $OFF_{threshold\_5}$ 40.83%, $OFF_{threshold\_4}$ 35%, $OFF_{threshold\_3}$ 28.75%, and $OFF_{threshold\_2}$ 21.7%. The power module with $N_{unique}=7$ is controlled to enter OFF status from ON status after the OFF delay time $OFF_{delay\_7}$ 1 s is exceeded. The power modules with the unique number $N_{unique}$ from 0 to 6 are used to provide sub power to the load 130, and the $I_{share}$ becomes 22.8% after 1 s.

The $I_{share}$ 22.8% is still lower than $OFF_{threshold\_6}$ 46.43%, $OFF_{threshold\_5}$ 40.83%, $OFF_{threshold\_4}$ 35%, and $OFF_{threshold\_3}$ 28.75%. The power module with $N_{unique}=6$ is then controlled to enter OFF status from ON status after the $OFF_{delay\_6}=5$ s is exceeded, that means the power module $N_{unique}=6$ works at OFF status 4 s later after the power module $N_{unique}=7$ works at OFF status. The power modules with the unique number $N_{unique}$ from 0 to 5 are used to provide sub power to the load 130, and the $I_{share}$ becomes 26.7% after 5 s.

The $I_{share}$ 26.7% is still lower than $OFF_{threshold\_5}$ 40.83%, $OFF_{threshold\_4}$ 35%, and $OFF_{threshold\_3}$ 28.75%. The power module with $N_{unique}=5$ is controlled to enter OFF status from ON status after the $OFF_{delay\_5}=9$ s is exceeded, that means the power module $N_{unique}=5$ works at OFF status 4 s later after the power module $N_{unique}=6$ works at OFF status. The power modules with the unique number $N_{unique}$ from 0 to 4 are used to provide sub power to the load 130, and the $I_{share}$ becomes 32% after 9 s.

The $I_{share}$ 32% is still lower than $OFF_{threshold\_4}$ 35%. The power module with $N_{unique}=4$ is controlled to enter OFF status from ON status after the $OFF_{delay\_4}=13$ s is exceeded, that means the power module $N_{unique}=4$ works at OFF status 4 s later after the power module $N_{unique}=5$ works at OFF status. The power modules with the unique number $N_{unique}$ from 0 to 3 are used to provide sub power to the load 130, and the $I_{share}$ becomes 40% after 13 s.

At this time, the $I_{share}$ 40% is between the $ON_{threshold\_3}$ 45% and the $OFF_{threshold\_3}$ 28.75%. Eventually, the power modules with the unique number $N_{unique}$ from 0 to 3 are used to provide sub power to the load 130. The current sharing circuit 240 is used to combine the sub power received from the power modules with unique number $N_{unique} \in (0, 1, 2, 3)$ into a final power for providing to the load 130. Then, the power between the plurality of power module 220a~220n and the load 130 is balanced.

Figure 7:
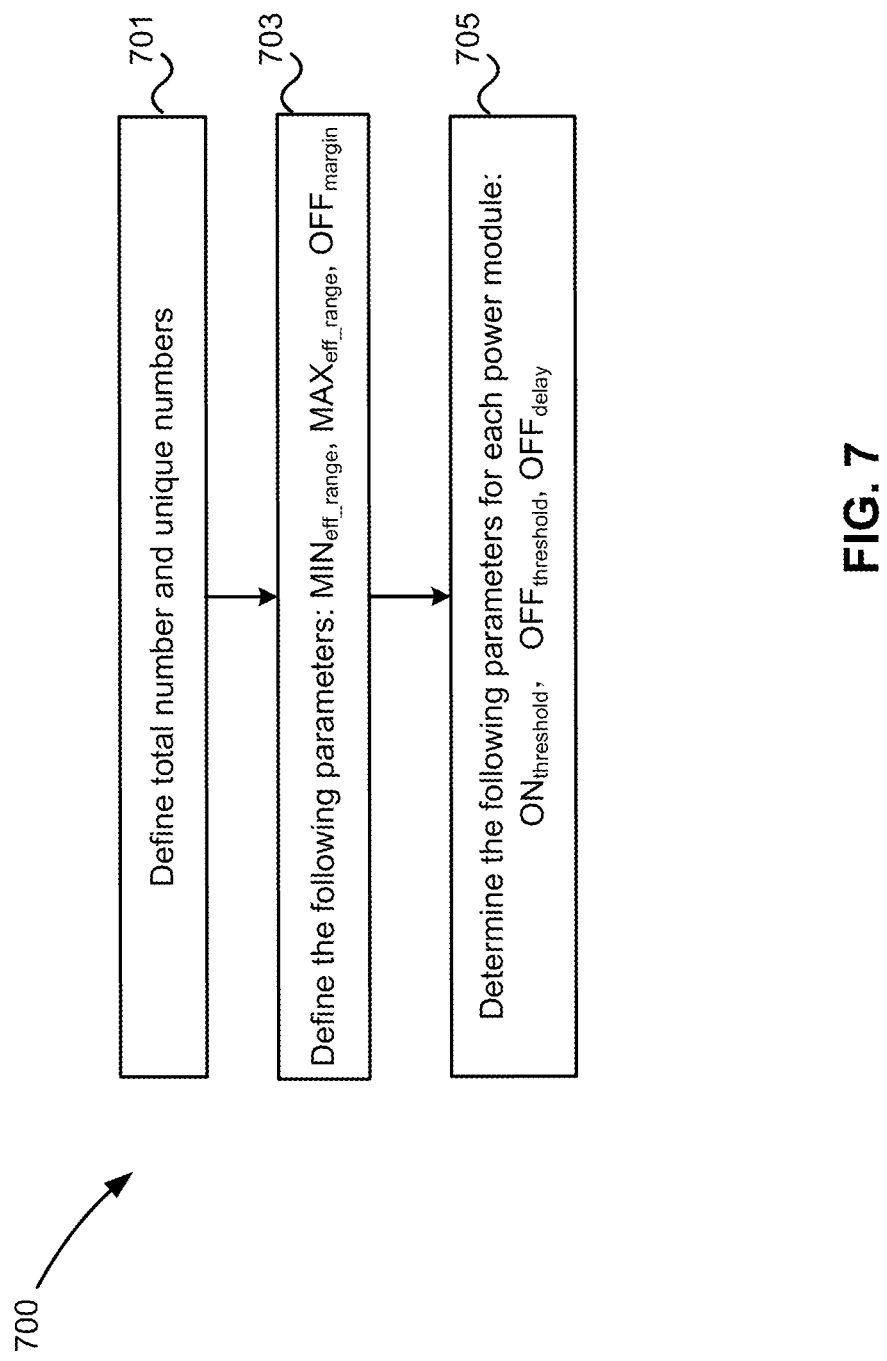
FIG. 7 is a flowchart of an initialization process for controlling a power distribution system shown in FIG. 2 or FIG. 3 in accordance with an illustrative embodiment.

Referring to FIG. 7, a flowchart 700 of an initialization process for controlling a power distribution system shown in FIG. 2 or FIG. 3 is shown. The initialization process includes the following steps. At block 701, a controller (the master controller 250 shown in FIG. 2 or the sub controller 223a shown in FIG. 3) is configured to provide a total number of the power modules and unique numbers to each member of the power modules. At block 703, some initialization parameters such as $MIN_{eff\_range}$, $MAX_{eff\_range}$, $OFF_{margin}$ are defined in the controller. At block 705, some parameters such as $ON_{threshold}$, $OFF_{threshold}$, and $OFF_{delay}$ are determined for each power module according to the total number, the unique numbers, and the initialization parameters.

In some embodiments, the above steps can be programmed or set up in the controller and then sent to each sub controller. In some embodiments, the above steps can be programmed or set up in each sub controller itself. In some embodiments, the above steps can be implemented during manufacturing or factory test time by an off-line controller.

Figure 8:
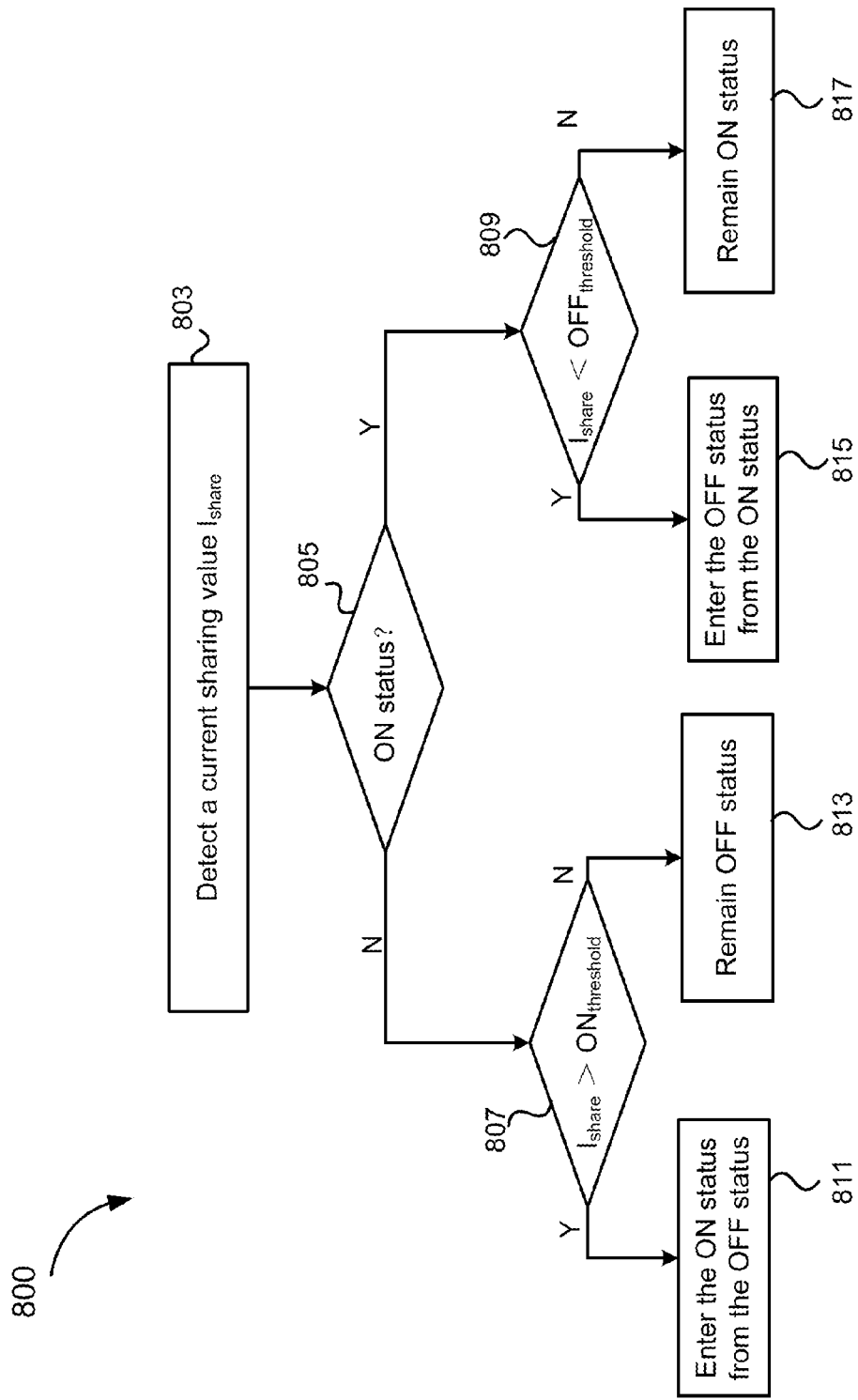
FIG. 8 is a sub flowchart of an operating process for controlling a power distribution system shown in FIG. 2 or FIG. 3 in accordance with an illustrative embodiment.

Referring to FIG. 8, a sub flowchart of an operation process for controlling a power distribution system shown in FIG. 2 or FIG. 3 is shown. While the actions of the method 800 are illustrated as functional blocks, the order of the blocks and the separation of the actions among the various blocks shown in FIG. 8 are not intended to be limiting. For example, the blocks may be performed in a different order and an action associated with one block may be combined with one or more other blocks or may be sub-divided into a number of blocks.

In the operation process, at least one power module is set up to independently determine its ON status or OFF status. At block 803, a current sharing value $I_{share}$ is detected by a current sharing circuit or calculated by a controller. At block 805, for a power module, its sub controller is configured to decide whether the power module is operated at ON status or not. If the power module works at ON status, the process goes to block 809. If the power module works at OFF status, the process goes to block 807.

The sub controller is configured to compare the $I_{share}$ with $ON_{threshold}$ and $OFF_{threshold}$ as shown at blocks 807 and 809. More specifically, when the power module is operated OFF status. If $I_{share}$ is higher than the $ON_{threshold}$, the power module is controlled to enter ON status from OFF status 811. Otherwise, the power module is remained at OFF status 813.

When the power module is operated at ON status. If $I_{share}$ is lower than the $OFF_{threshold}$, the power module is controlled to enter OFF status from ON status 815. Otherwise, the power module is remained at ON status 817.

Further, as will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

What is claimed is:

1. A power distribution system, comprising:
multiple power modules coupled in parallel to supply power to a load, each power module having a corresponding $I_{share}$ with an associated $ON_{threshold}$ and an associated $OFF_{threshold}$ respectively, wherein the $I_{share}$ comprises an average current related to the load;
a controller configured to provide a total number of the power modules and unique numbers to each member of the power modules;
wherein at least a member of the multiple power modules is set up to independently determine its own ON status and OFF status based on the total number and the unique numbers when the power distribution system is in operation, wherein an $ON_{threshold}$ in association with a corresponding unique number is determined to decide its own ON status;

wherein when $I_{share}$ is lower than its $OFF_{threshold}$, the corresponding power module is switched to enter OFF status after its $OFF_{delay}$ is exceeded.

2. The power distribution system of claim 1, wherein:
at least a member of the multiple power modules is set up to remain ON status; and
the other of the multiple power modules are set up to independently determine its own ON status and OFF status according to a comparison of the corresponding $I_{share}$ with the associated $ON_{threshold}$ and the associated $OFF_{threshold}$ respectively.

3. The power distribution system of claim 1, wherein each power module comprises a sub controller, one of the sub controllers is used as the controller, and the controller is programmed to provide the total number and $ON_{threshold}$ to the at least a member of the multiple power modules.

4. The power distribution system of claim 1, wherein the $ON_{threshold}$ lies within a 40%-65% load efficiency range of each power module.

5. The power distribution system of claim 1, wherein each unique number is randomly assigned to each sub controller.

6. The power distribution system of claim 1, where $I_{share}$ is lower than its $ON_{threshold}$, the corresponding power module is switched to enter ON status after its $ON_{delay}$ exceeded.

7. An energy distribution system, comprising:
multiple energy modules coupled in parallel to supply power to a load; and
a controller configured to provide a total number of the multiple energy modules and unique numbers to each member of the multiple energy modules;
wherein at least a member of the multiple energy modules is set up to remain an ON status and each of the other energy modules is set up to independently determine its own ON status or OFF status based on the total number of the energy modules, the unique numbers, and an $I_{share}$ when the energy distribution system is in operation, wherein the $I_{share}$ comprises an average current related to the load; and
wherein a corresponding unique number is indicative of an $ON_{threshold}$, an $OFF_{threshold}$ with each energy module, and a comparison of its $ON_{threshold}$ and $OFF_{threshold}$ with the $I_{share}$ is used to decide its own ON status and OFF status respectively.

8. The energy distribution system of claim 7, wherein the corresponding $OFF_{threshold}$ and $ON_{threshold}$ are spread apart by a hysteresis value.

* * * * *